J. A. WARNER.
MACHINE FOR HANDLING FRUIT.
APPLICATION FILED OCT. 26, 1908.

980,462.

Patented Jan. 3, 1911.

2 SHEETS—SHEET 1.

WITNESSES:
Clarence W. Carroll
D. Gurnee

INVENTOR:
John A. Warner
by Ozro F. Davis
his Attys

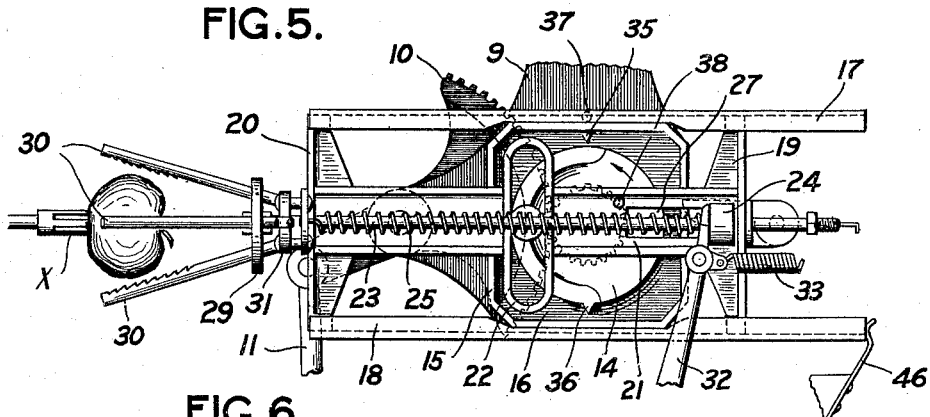
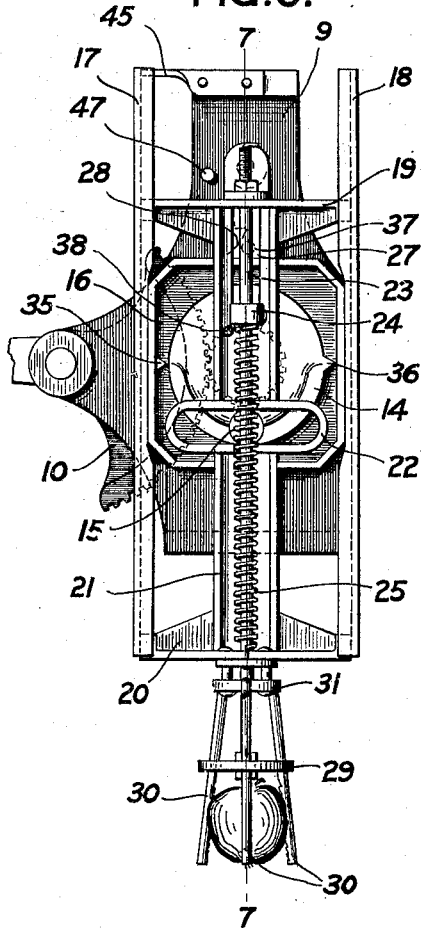
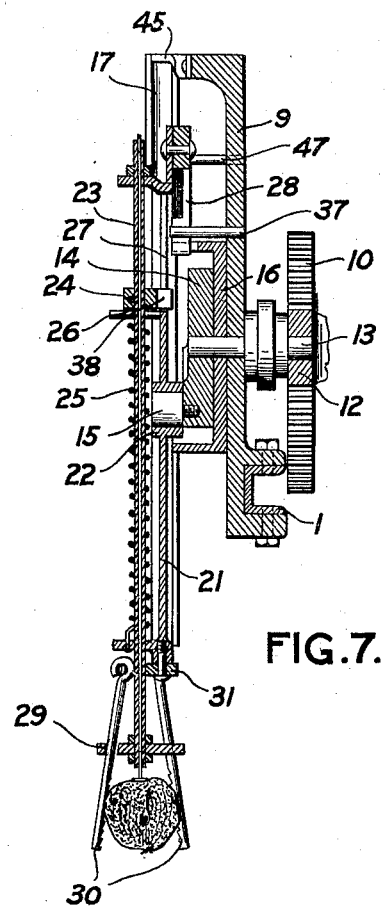

UNITED STATES PATENT OFFICE.

JOHN A. WARNER, OF ONTARIO, NEW YORK, ASSIGNOR TO FREEMAN PINTLER, OF ONTARIO, NEW YORK.

MACHINE FOR HANDLING FRUIT.

980,462. Specification of Letters Patent. Patented Jan. 3, 1911.

Original application filed May 31, 1906, Serial No. 319,511. Divided and this application filed October 26, 1908. Serial No. 459,626.

*To all whom it may concern:*

Be it known that I, JOHN A. WARNER, a citizen of the United States, and resident of Ontario, in the county of Wayne and State of New York, have invented certain new and useful Improvements in Machines for Handling Fruit, of which the following is a specification.

This invention relates to machines for handling fruit, and particularly to machines for automatically grasping the fruit in one position, as, for instance, at equal distances from its axis, and to set the fruit upon a support, such as the fork of a paring machine, in a particular desired position with relation to its axis. In the case of apples, the line passing through the stem and blossom portions of the apple passes through the center of the core, and constitutes what may be called the core-axis. In a paring machine the apple is turned around this core-axis during the paring operation, and the core is removed by cutting out a cylindrical piece whose axis is the said core-axis.

This application is a division of my application No. 319,511, filed May 31, 1906.

Figure 2:
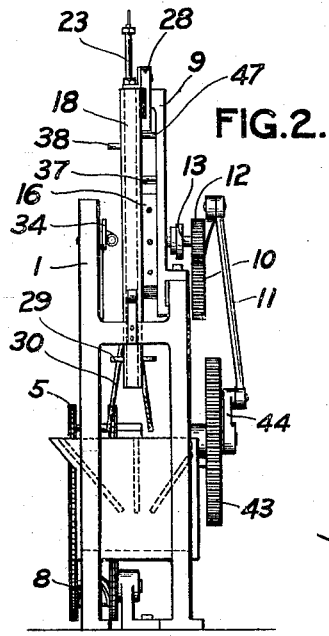
Figure 1:
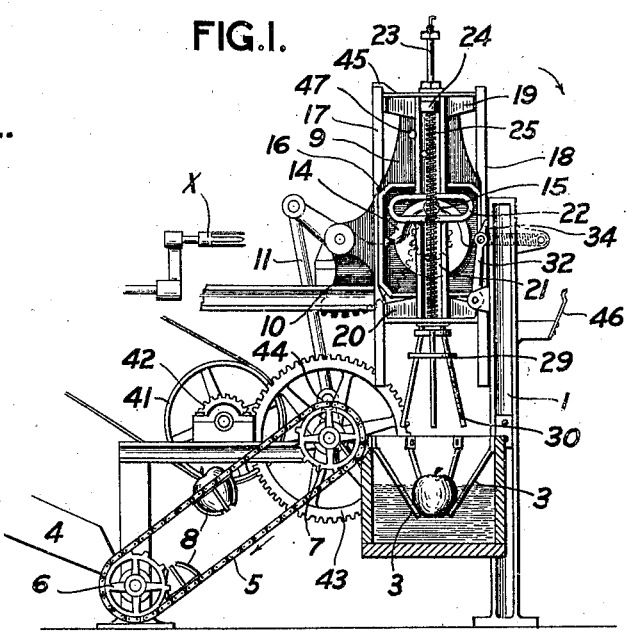
Figure 3:
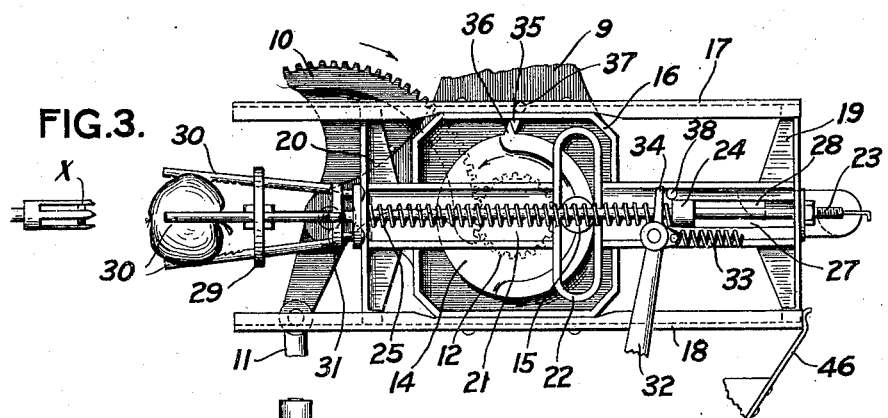
Figure 4:
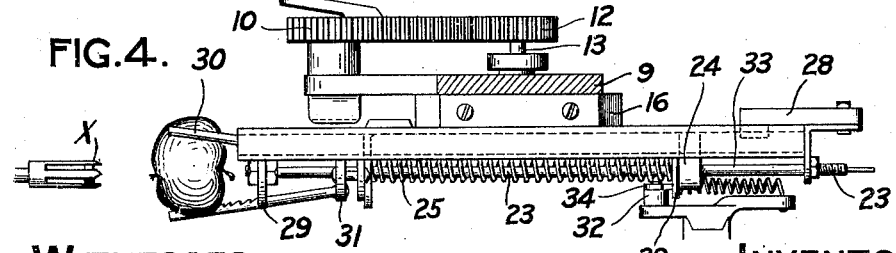

In the drawings:—Figure 1 is a side elevation of a machine embodying this invention, a portion being shown in section to exhibit interior construction; Fig. 2 is an end elevation of the same machine; Fig. 3 is an elevation of part of the same machine showing the parts in the position where an apple is ready to be forced upon the fork of a paring machine; Fig. 4 is a top plan view of the same parts, and in the same position, shown in Fig. 3; Fig. 5 is an elevation of the same parts shown in Figs. 3 and 4, but showing the apple released; Fig. 6 is an elevation of the same parts shown in Figs. 3 to 5 after having grasped an apple; and Fig. 7 is a section on the line 7—7 of Fig. 6.

The machine has a suitable frame 1, a series of converging fingers 3 forming a conical basket. Means are provided for delivering fruit one by one into the said basket. As an instance of such means, there is shown a chute 4 whose end is closed by the belt 5 that passes around the pulleys 6, 7. One or both of said pulleys may have teeth upon them, as shown, which pass into perforations or sockets in the belt 5 in order to prevent slipping of the belt upon the pulleys, or either of them. The said belt carries a series of pockets of a size adapted to take individual fruit and to carry the fruit along with the movement of the belt and to deliver the fruit in succession. In the present instance the said pockets 8 are basket-like and formed of open wire, which wire may, if desired, be more or less flexible and elastic in order to fit the fruit which drops into it. When a basket comes opposite the end of the chute 4, the fruit in said chute will drop into that basket, and is carried in the upwardly inclined direction, shown in Fig. 1, until finally it is discharged into the basket 3.

Means are provided for seizing the apple and delivering it to other apparatus, such as coring, paring, and slicing machines. In the present instance, the apple is to be delivered to a receiving device, such as the fork X of a machine, such as a paring machine, and this fork is to be inserted into the apple so that the axis of the fork and the core-axis of the apple will be substantially in line, and this is accomplished by grasping the apple, moving it to a delivering position and delivering it to the receiving device. Specifically, this operation is performed through a reciprocating or laterally moving or rocking frame which carries jaws for grasping the fruit.

Upon a suitable support 9 carried by the frame 1 is pivoted an oscillating toothed segment 10, operated, if desired, by a link 11. This segment meshes with a pinion 12 on the back of said support, and the said pinion is fixed on a shaft 13 projecting through said support, and carries also the crank plate 14 having upon it the crank pin 15. Around the axis of the shaft 13, and preferably supported upon said shaft, is a frame 16 carrying guiding means for the fruit holding device. These guiding means in the present form of the apparatus are a pair of guide ways 17 and 18 fastened to said frame 16. In the said guide ways 17 and 18 slides a frame of suitable form, in the present case consisting of the cross heads 19 and 20 connected by the plate 21. The said plate 21 comprises the loop or slot frame 22 in which rests the crank pin 15, so that by movement of said crank pin the said frame is reciprocated in the guide ways. Longitudinally arranged on said frame is the fruit grasping mechanism, consisting of the rod 23 having upon it the adjustable collar 24. Around the rod 23 is coiled the spring 25 that is fastened at one end to the cross head 20, or to some other stationary portion of the reciprocating frame, and fastened at the other end to the collar 24. The collar 24 has a lug 26, Fig. 7, that projects through a slot 27 in the reciprocating frame above mentioned, and is adapted to engage and be held by a support on said frame. This support is a tilting hook 28 pivoted on the cross head 19, and which is adapted to engage and support the said collar when the parts are in the position shown in Figs. 1 and 5. The rod 23 passes through the cross head 20, and on its end is a plate 29. Through perforations in this plate 29 pass three bars or jaws 30, whose upper ends are hinged to a stationary plate 31 carried by said cross head 20. The jaws 30 are so hinged as to move in planes radial to the extended axis of the rod 23. The points at which the ends of the jaws 30 are hinged to the plate 31 are nearer together than the points at which said jaws pass through the plate 29, and therefore longitudinal movement of the plate 29 will cause the jaws to open and to close. It will now be seen that when the lug 26 is engaged by the hook 28, the spring 25 will be extended and the jaws 30 will be opened to the positions shown in Fig. 5, but when the lug 26 is free from the hook 28, the spring 25 pulls the collar 24 and the rod 23 toward the cross head 20 and the parts will take the position shown in Figs. 3, 4, 6 and 7, in which the jaws are closed.

In order to move the collar 24 and lug 26 into the position of engagement with the hook 28, the following means are provided: To the frame 1 is pivoted a lever 32 pulled by a spring 33 that is stronger than the spring 25. The said spring 33 is fastened at one end to the lever 32, and at the other end to said frame. The end of the lever 32 is a pivoted dog 34, which will permit a part to pass it when moving toward the right in Fig. 3, but will stop the same part after having made the movement just described and when the reverse movement is attempted. This is accomplished in the present form of the device by making the dog 34 a bell crank lever, as shown clearly in Figs. 3 and 5, and attaching the spring 33 to the arm thereof, the said bell crank being pivoted to the end of the lever 32. Thus, when the spring 33 is not under heavy tension, the collar 24, moving toward the right in Fig. 3, would tilt the dog 34 until the said collar could pass it, so that the parts will take the position shown in Fig. 3. If now the frame carrying the jaws 30 is moved toward the left in Fig. 3, and into the position shown in Fig. 5, the collar 24 will press against the dog 34 and will increase the tension of the spring 33, whereby, on account of the strength of said spring, the dog 34 will be held stationary and the collar 24 being held by said dog while the remainder of the frame moves toward the left, the hook 28 moves into engagement with the lug 26 until it latches therewith. This movement causes relative movement of the plates 29 and 31, and opens the jaws to the position shown in Fig. 5 for releasing a fruit that has been grasped by said jaws. Upon the frame 16, which is a part that rotates or tilts with the frame carrying the jaws, is a lug or stop 35, and upon the crank plate 14 is a lug 36 adapted to make contact with said stop 35. Upon a suitable portion of the frame, such as the support 9, is a pin 37, which, when the jaws 30 are in position to seize an apple, makes contact with an angular face upon the latch or hook 28 and moves it from under the lug 26, thus releasing the collar 24 and permitting the spring 25 to pull the rod 23 and plate 29 downward into the position shown in Figs. 6 and 7, thus closing the jaws 30 upon the apple. The jaw frame carries a pin 38 for a purpose to be described.

The number of teeth on the segment 10 with relation to the teeth on the pinion 12 is such as by movement of said segment in one direction to cause one turn and a quarter of said pinion 12.

Suitable driving means are provided for the segment 10 and for the belt 5, which may be, as shown in the present instance, a driving pulley 41 having a gear 42 meshing with a gear 43 upon the shaft of one of the belt pulleys, such as the pulley 7. The shaft of this same pulley carries a crank 44 which is attached to the lower end of the link 11. By this means the timing of the parts of the apparatus is accomplished, so that after an apple is dropped into the basket 3, the jaws 30 return to place and descend into said basket and grasp the apple. Then the jaws rise vertically from the basket carrying the apple, are tilted into the horizontal position in line with the fork X, force the apple on the fork, release the apple, withdraw in the horizontal line, tilt to the vertical position, and descend to grasp another apple.

An elastic plate 45 is attached to the frame 9, and engages, frictionally, the frame carrying the jaws, as, for instance, the guide 17 thereof, in order to catch the same and hold it in the vertical position shown in Figs. 1, 2, 6 and 7, and yet to permit the frame to be tilted into the horizontal position. The plate 45 is set in the path of the cross head 19, and is lifted by the cross head from engagement with the guide 17 when the cross head reaches its highest position, as shown in Fig. 1.

A more detailed description of the operation of the machine is as follows: Starting with the parts in the position shown in Fig.

1, the frame carrying the jaws is in the vertical position, and is held in that position by the catch plate 45. At the end of the return stroke to the position just mentioned, the frame 21 strikes a pin 47 on the support 9, which determines the vertical position of the jaw frame. The cross head 19 at the upper end of its stroke in the position shown in Fig. 1, lifts the catch 45 from engagement with the guide 17. The collar 24 is latched and retained by the hook 28, thus extending the spring 25 and opening the jaws 30. As the segment 10 swings upward, the crank pin 15 is turned, which lowers the jaws 30 until they surround the apple in the basket 3. At this time the parts are not quite in the position shown in Fig. 6, but at the lowest part of the downward stroke of the jaws the pin 37 releases the lug 26 from the hook 28 and the contraction of the spring 25 moves the plate 29 downward and causes the jaws 30 to close upon the apple. This is the position of Fig. 6. Continued upward movement of the segment 10 causes rotation of the plate 14, which lifts the cross heads 19, 20, and their connecting plate 21 (which constitutes part of the jaw carrying frame), and when the crank pin has reached its highest position shown in Fig. 1, the cross head 19 strikes the latch 45 and releases the frame therefrom, so that on the continued upward movement of the segment 10 the frame carrying the jaws is swung laterally or rocked until said frame takes the horizontal position shown in Fig. 3 with the lug 36 against the stop 35. As the frame reaches the horizontal position, the pin 38 on the frame drops behind the point of the lever 32, as shown in Figs. 3 and 4, and this is the position of complete upward oscillation of the segment 10. The frame carrying the jaws is held in the horizontal position by a spring catch 46 which holds the said frame by friction, but permits the horizontal reciprocatory movements described. The segment 10 now commences a return oscillation from the position of the parts shown in Fig. 3, and the rotation of the crank pin moves the jaw frame toward the left in said Fig. 3, thus tilting the lever 32 and extending its spring 33. This movement projects the jaw carrying frame toward the left until the apple held by the jaws is set upon the fork or other receiving device X for the fruit. It will be noted that the fruit has been grasped and held by the jaws so that its core axis is kept in the same relative position with reference to the mechanism that carries it, so that if the core axis is vertical when the apple was grasped, the said core axis will be horizontal when brought into the position just described. It will be noted that while the jaw carrying frame has been moving toward the left under the influence of the crank pin, the spring 33 (which is stronger than the spring 25) has been considerably extended. At the limit of the stroke of the jaw carrying frame toward the left, the pin 38 slips over the point of the lever 34 and releases said lever, so that under the influence of the spring 33 it flies toward the right in Fig. 3, and pressing upon the collar 24 moves said collar until the lug 26 is caught by the hook 28. When this has occurred, the upward movement of the segment 10 and the rotation of the crank pin continues until the projection or lug 36 strikes against the right hand face of the stop 35, and then by reason of this positive engagement the frame is released from the catch 46 and is tilted into the vertical position shown in Fig. 1. As the frame reaches said vertical position it is caught and held by the catch 45. Thus the parts have been carried through the complete cycle of operations.

It will be noted that the gripping jaws and their operating mechanisms constitute a feeding head, that the plate 29 constitutes a movable follower engaging the jaws, which is actuated by the spring 25 that tends to close said jaws, and that the elastic plate 45 engages the feeding head to hold it in its vertical or receiving position.

What I claim is:—

1. In a fruit handling device, a fruit holder, a rocking and reciprocating mechanism comprising an opening and closing grasping device, and means for closing said device on a fruit and rocking and reciprocating said device to place said fruit on said holder and opening said device to release said fruit and rocking said device to its initial position.

2. In a fruit handling device, the combination of a fork or like holder for a fruit, mechanism for taking hold of a fruit and retaining said hold of said fruit to transfer the same from a receiving position to said fork and to open to release said fruit and to return to its initial position, and means for operating said mechanism to perform said functions in the order stated.

3. In a fruit handling device, a fruit holder, a rocking and reciprocating grasping mechanism, means for operating said mechanism to grasp a fruit and to rock and to reciprocate to place said fruit on said holder and to release said fruit and to rock to its initial position, and means for delivering fruit in succession to said rocking and reciprocating mechanism.

4. In a fruit handling device, the combination of a fork or like holder for a fruit, mechanism for taking hold of a fruit and retaining said hold of said fruit to transfer the same from a receiving position to said fork, and means for delivering fruit in succession to said mechanism.

5. In a fruit handling device, the combination of a holder, a jaw carrier, a set of jaws, means for actuating the jaw carrier to move the jaws to a fruit and to place the fruit on the holder, and means for closing the jaws upon the fruit and for opening the jaws to release the same.

6. In a fruit handling device, the combination of a holder, a jaw carrier, a set of jaws, means for actuating the jaw carrier to move the jaws to grasp a fruit and to place the fruit on the holder and to return to its initial position, and means for closing the jaws upon the fruit and for opening the jaws to release the same, whereby the fruit is held firmly by the jaws during its movement from the grasping to the releasing position.

7. In a fruit handling device, the combination of a jaw carrier, a set of jaws, jaw-actuating mechanism, means for actuating the jaw carrier to move the jaws to grasp a fruit and to transfer the fruit to another position and to return to its initial position, means for closing the jaws upon the fruit and for opening the jaws to release the same, and a fork in the line of movement of said jaw carrier; whereby the fruit is held firmly by the jaws during its movement from the grasping position until it is forced upon the fork.

8. In a fruit handling device, the combination of a rocking and reciprocating jaw carrier, a set of jaws, jaw-actuating mechanism, means for actuating the jaw carrier to move to a fruit and to move from this position, means for operating the jaw-actuating mechanism to move the jaws to grasp a fruit, to project the fruit in a particular direction and to release the fruit, and means for receiving a fruit from said jaws.

9. In a fruit handling device, the combination of a rocking and reciprocating jaw carrier, a set of jaws, jaw-actuating mechanism, means for actuating the jaw carrier to move to a fruit and to move from this position, means for operating the jaw-actuating mechanism to move the jaws to grasp a fruit, to project the fruit in a particular direction and to release the fruit, and a fork in the line of movement of the mechanism whereby a fruit is forced thereon.

10. In a fruit handling device, the combination of a rocking frame, a frame reciprocating on said rocking frame, a set of jaws, a jaw carrier carried by said reciprocating frame, jaw-operating mechanism, and means for positively moving said reciprocating frame to cause the jaws to seize a fruit, then for rocking said rocking frame and said reciprocating frame, and then for reciprocating said reciprocating frame to discharge the fruit from said jaws.

11. In a fruit handling device, a rocking frame, a frame reciprocating on said rocking frame, a set of jaws, a jaw carrier carried by said reciprocating frame, jaw-operating mechanism, a crank for operating said reciprocating frame, stops for limiting the movement of said reciprocating frame and for transferring the crank movement to said rocking frame, and means coöperating with said crank for causing a reciprocation of the reciprocating frame at each end of the rocking movement thereof.

12. In a fruit handling device, the combination of a rocking frame, a frame reciprocating on said rocking frame, a set of jaws, a jaw carrier carried by said reciprocating frame, jaw-operating mechanism, and means for positively moving said reciprocating frame to cause the jaws to seize a fruit, then for rocking said rocking frame and said reciprocating frame, and then for reciprocating said reciprocating frame to deliver the fruit from said jaws, means for locking said jaws in the open position, and means for releasing the lock to grasp a fruit.

13. In a fruit handling device, a rocking frame, a frame reciprocating on said rocking frame, a set of jaws, a jaw carrier carried by said reciprocating frame, jaw-operating mechanism comprising means for locking said jaws in the open position and means for releasing the lock to grasp a fruit, a crank for operating said reciprocating frame, stops for limiting the movement of said reciprocating frame and for transferring the crank movement to said rocking frame, and means coöperating with said crank for causing a reciprocation of the reciprocating frame at each end of the rocking movement thereof.

14. In a fruit handling device, a rocking frame, a reciprocating frame carried by said rocking frame, a set of jaws, a jaw carrier carried by said reciprocating frame, a crank for operating said reciprocating frame, stops for limiting the movement of said reciprocating frame and for transferring the crank movement to said rocking frame, and means carried by said frames for opening and closing the jaws at definite points in the rocking and reciprocation of said frames.

15. In a fruit handling device, holding means for the fruit, and mechanism for feeding the fruit one by one to said holding means comprising a pair of gripping members movable to and from the holding means, means for opening and closing said gripping members, additional means for locking the gripping members in their open position, means for throwing the locking means out of operative position, and further means for closing the gripping members.

16. In a fruit handling device in combination with holding means for the fruit, a rotary support, gripping jaws mounted upon and rotating with said support to and from the holding means, and movable axially relatively to said holding means, means for holding the jaws open when in their receiving position, means for closing the jaws upon the apple when moving from the receiving to the delivering position, and additional means for moving the jaws axially.

17. In a fruit handling device, the combination of a jaw carrier, a set of jaws, jaw-actuating mechanism, means for actuating the jaw carrier to move the jaws to a fruit and to transfer the fruit to another position, means for automatically closing the jaws upon the fruit and for opening the jaws to release the same, and a fork in the line of movement of said jaw carrier whereby the fruit is forced upon the fork without change of its position in the act of transfer.

18. In a fruit handling device, the combination of a rocking and reciprocating jaw carrier, a set of jaws, jaw-actuating mechanism, means for actuating the jaw carrier to move to a fruit and to move from this position, means for operating the jaw-actuating mechanism to move the jaws to grasp a fruit, to project the fruit in a particular direction and to release the fruit, and means for receiving a fruit from said jaws without change of its position in the act of transfer.

19. In a fruit handling device, the combination of a rocking and reciprocating jaw carrier, a set of jaws, jaw-actuating mechanism, means for actuating the jaw carrier to move to a fruit and to move from this position, means for operating the jaw-actuating mechanism to move the jaws to grasp a fruit, to project the fruit in a particular direction and to release the fruit, and a fork in the line of movement of the mechanism whereby a fruit is forced thereon without change of position in the act of transfer.

20. The combination with the feeding head provided with gripping jaws, of a movable follower engaging said jaws, a spring acting upon said follower and tending to close said jaws, and a spring catch engaging said head in its receiving position, substantially as set forth.

JOHN A. WARNER.

Witnesses:
C. M. WEEKS,
S. C. REED.